Sept. 14, 1943.　　　　F. V. HART　　　　2,329,197
MACHINE FOR APPLYING PRESSURE TO WORK
Filed May 25, 1942　　　　5 Sheets-Sheet 2

INVENTOR
Fred V. Hart
by his attorney
Frederick L. Edmonds Sept. 14, 1943.　　　　F. V. HART　　　　2,329,197
MACHINE FOR APPLYING PRESSURE TO WORK
Filed May 25, 1942　　　　5 Sheets-Sheet 3

INVENTOR
Fred V. Hart
by his attorney
Frederick L. Edmunds

Sept. 14, 1943.  F. V. HART  2,329,197
MACHINE FOR APPLYING PRESSURE TO WORK
Filed May 25, 1942  5 Sheets-Sheet 4

INVENTOR
Fred V. Hart
By his attorney
Frederick L. Emmons

Sept. 14, 1943.　　　F. V. HART　　　2,329,197
MACHINE FOR APPLYING PRESSURE TO WORK
Filed May 25, 1942　　　5 Sheets-Sheet 5

Fig. 10.

INVENTOR
Fred V. Hart
by his attorney
Frederick L. Edmunds

Patented Sept. 14, 1943

2,329,197

UNITED STATES PATENT OFFICE 2,329,197

MACHINE FOR APPLYING PRESSURE TO WORK

Fred V. Hart, Lynn, Mass., assignor to United Shoe Machinery Corporation, Flemington, N. J., a corporation of New Jersey Application May 25, 1942, Serial No. 444,309

32 Claims. (Cl. 12—33)

This invention relates to machines for applying pressure to work and is illustrated herein as applied to a sole-leveling machine of the direct-pressure type such as that shown and described in Letters Patent of the United States No. 818,504, granted April 24, 1906 on an application filed in the name of E. E. Winkley. Machines of this type are commonly required to operate on shoes of a wide range of sizes and uniform results can be obtained only if a uniform unit pressure is applied to the soles of the shoes regardless of their sizes. Accordingly, such machines have been provided with adjusting means by which the total pressure applied to the soles can be varied to permit the application of greater pressure to large soles than to small soles. In order to effect such variation in pressure in accordance with the size of the shoe to be operated upon, it has heretofore been necessary for the operator manually to adjust the machine. The time required for the operator to make the required adjustment necessarily reduces the capacity of the machine, and the uniformity of the results obtained by the machine is dependent upon the care and skill of the operator in making the adjustment. In order to speed up the operation of the machine the operator may not make the adjustment as carefully as necessary to secure the best results or he may neglect to make any adjustment whatever, thereby producing an inferior quality of work.

It is an object of the present invention to overcome the objections outlined above by providing, in a machine for applying pressure to work, means for automatically adjusting the pressure applied in accordance with the size of the work piece to be operated upon. More specifically, it is an object of the present invention to provide, in a machine for applying pressure to shoe bottoms, means for automatically adjusting the pressure applied in accordance with the size of the shoe. This object is attained in the illustrated embodiment of the invention by providing means which measures the length and width of the bottom of a shoe as the shoe is presented to the machine and utilizing this means automatically to adjust the machine to impart a predetermined unit pressure to the shoe bottom.

As illustrated herein, the size of the shoe bottom is measured by a plurality of gages arranged to contact the periphery of the shoe bottom at the toe end and at the sides in the vicinity of the ball line. The gages are positioned in accordance with the length and width of the shoe bottom upon presentation of the shoe to the machine and act through mechanism adjustably to limit the pressure applied to the shoe bottom. In accordance with a feature of the invention, the pressure is applied by a toggle mechanism one link of which is yieldably supported by fluid-pressure-controlled means which is in turn controlled by the gages in accordance with the size of the shoe bottom to cause the toggle-supporting means to yield after a predetermined pressure has been applied thereto.

To avoid interference with the upper presser member, the gages associated with the shoe support are moved away from the shoe before pressure is applied to the shoe bottom. As a further feature of the invention, the gages are withdrawn without varying the adjustment of the pressure-applying mechanism after it has been initially set by the gages upon presentation of a shoe to the machine. In the illustrated embodiment of the invention, a pair of wedges are positioned relatively to each other by the gages when they are in turn positioned by the shoe. The relative positions of the gages determine the compression of a spring controlling a release valve associated with the fluid-pressure mechanism which in turn determines the maximum pressure applied to the shoe bottom during the pressing operation. After the wedges have been positioned by the gages the shoe support is moved from a loading position into a position in alinement with the upper pressing member. During this movement of the shoe support these wedges are forced together and thereby locked against relative movement, after which the gages are moved away from the shoe without affecting the setting of the wedges. After the shoe support and upper presser member are in alinement, pressure, determined by the previous setting of the wedges, is applied to the shoe bottom, the gages having been retracted sufficiently to avoid interference with the upper pressing member.

The above and other features of the invention, including various novel details of construction and combinations of parts, will now be more particularly described by reference to the accompanying drawings and pointed out in the claims.

The machine includes a frame 10 on which there is mounted a vertically movable slide 12. In the upper end of the slide there is mounted a horizontally movable table 14 which is guided for rectilinear movement in a slideway formed by gibs 15 (Fig. 3). Carried by the table 14 is a heel post 16, supporting a last-engaging pin 17 (Fig. 4), and a toe post 18 having a toe rest 19 for supporting the heel and toe portions respectively of a lasted shoe. The toe post 18 is adjustable in a guideway 21 formed in the table 14 and is held in adjusted position by a set screw 23. An upper presser member 20 (Fig. 1) is carried by a vertically movable slide 22 and has a pressing surface shaped to conform to the contour of the bottom of the shoe to which pressure is to be applied. After the shoe has been positioned on the heel post and toe post, the table 14 is moved rearwardly on the slide 12, as will be described, into a position directly beneath the presser member 20, after which the presser member moves into contact with the bottom of the shoe. The presser member is locked in this position, and the slide 12 is then moved upwardly thereby to force the shoe against the presser member 20 under a heavy pressure.

Figure 10:
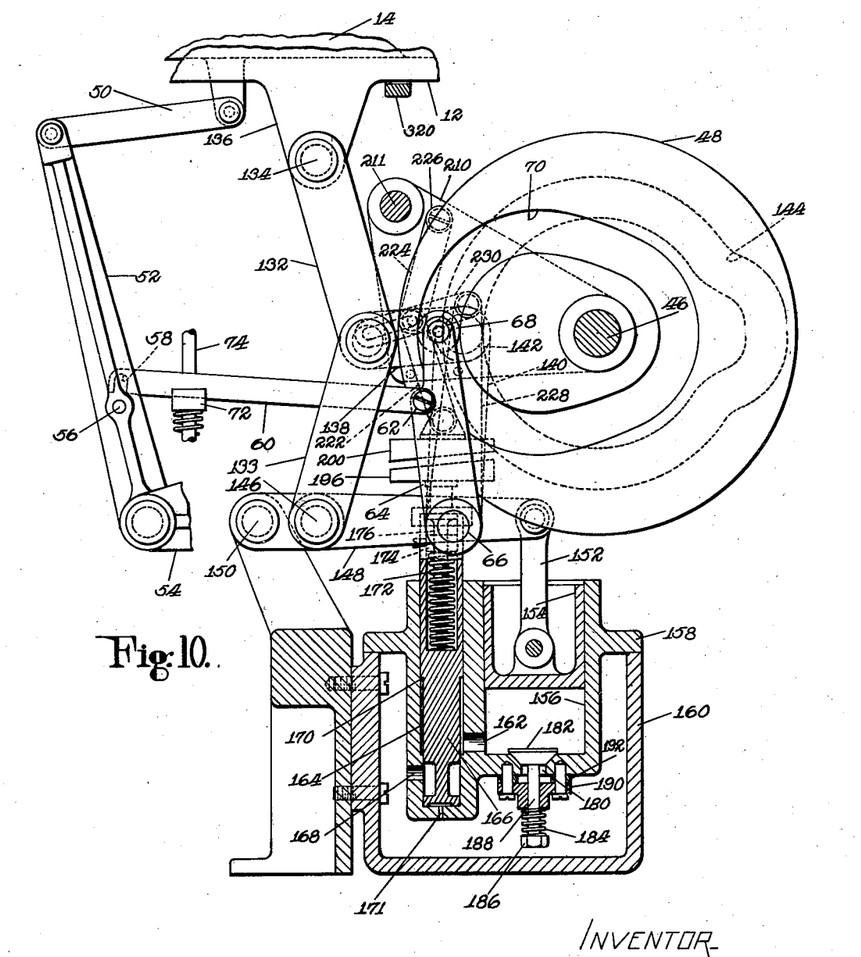
Fig. 10 is a view, partly in section, of the fluid-pressure mechanism by which one of the links of the pressure-applying toggle is supported.

Supported in the frame of the machine is a drive shaft 24 carrying a drive pulley 26 and a worm 28. This worm meshes with a worm gear 30 fast on a shaft 32 which in turn carries a pair of worms 34 and 36. The worm 36 is carried by a sleeve 38 loose on the shaft, and connected to the sleeve is a clutch element 40. A second clutch element 42 splined to the shaft 32 is arranged to be moved into engagement with the clutch element 40 to couple the worm 36 to the shaft. This worm drives a worm gear 44 on a cam shaft 46 to which is secured a cam 48, best shown in Fig. 10. This cam operates to move the table 14 to carry the shoe beneath the presser member 20 and to raise the slide 12 to apply pressure to the shoe bottom.

For moving the table rearwardly on the slide 12 it is connected by a link 50 to a lever 52, the lower end of which is pivoted to a bracket 54 on the slide 12. The lever 52 carries a pin 56 arranged to be received by an open-ended slot 58 in an end of a link 60, the other end of which is pivoted at 62 (Fig. 10) to an arm 64 pivoted to the frame by a shaft 66. The upper end of the arm 64 carries a cam roll 68 received by a cam groove 70 in the cam 48. When the machine is at rest, the link 60 is held in the position shown, with its end out of engagement with the pin 56 in the lever 52, by an arm 72 secured to a rod 74 slidable in bearings 76 and 78 in the slide 12. This rod is held in an elevated position as shown by a spring 80 acting between the arm 72 and the bearing 78. The upper end of the rod is arranged to be received by an opening 82 in the table 14 to lock the table in its loading position. Upon downward movement of the rod 74 by the depression of a treadle 84 acting on an arm 86 secured to the bottom of the rod, its upper end moves out of the opening in the table and the arm 72 carried by the rod is lowered to permit the link 60 to be coupled by the pin 56 and the slot 58 in the link to the lever 52, whereupon rotation of the cam 48 will cause the table 14 to move rearwardly to a position in which the shoe is directly below the upper presser member.

After this movement of the table 14, the upper presser member is allowed to move downwardly under the force exerted by a spring 88 acting against a nut 90 threaded on a rod 92 extending upwardly from the slide 22. The upper end of this spring acts against a bearing for the upper end of the rod, thereby to urge the slide 22 downwardly. This slide is connected by a link 94 to a lever 96 which is pivoted on a rod 98 supported by suitable bearings in the frame 10. The other end of the lever is connected by a link 100 to a lever 102 which is pivoted at 104 in the lower rear portion of the machine frame. The lever 102 carries a roll 106 arranged for engagement with the periphery of a cam (not shown) carried by the cam shaft 46. When the machine is at rest, this cam acts through the connections just described to hold the slide 22 in its uppermost position against the force exerted by the spring 88. Upon rotation of the cam shaft 46 and after the table 14 has been moved rearwardly, the slide 22 is allowed to move downwardly under the force exerted by the spring 88 to carry the upper presser member 20 into engagement with the shoe bottom under a light pressure.

After the presser member 20 has been moved downwardly, the slide 22 is locked against upward movement to permit the shoe to be forced upwardly under heavy pressure against the presser member. The slide is held in its downward position by a locking cam 110 secured to a shaft 112 journaled in the frame of the machine. Also secured to the shaft 112 is a rearwardly extending arm 114 which is connected by a link 116 to an arm 118 carried by the pivot rod 98. Another arm (not shown) carried by the rod 98 and secured to the arm 118 is connected by a link 120 to an end of a lever 122 pivoted at 104 and carrying a cam roll 126 arranged for engagement with the periphery of a cam (not shown) on the shaft 46. Through the connections described, the locking cam 110 is held in the position shown in Fig. 1 when the machine is at rest, but after the cam shaft 46 has rotated sufficiently to permit the presser member 20 to move into engagement with the shoe bottom, the locking cam 110 is permitted to move in a counter-clockwise direction under the force exerted by a spring 130 connected between the link 116 and the frame of the machine, thereby to lock the slide 22 in the position in which it has been moved by the spring 88. It will be understood that the amount of downward movement of the presser member will depend upon the height of the last, the thickness of the sole on the shoe bottom, etc. and will be positively locked against upward movement by the cam 110 in any position into which it is moved.

The presser member 20 now being in engagement with the bottom of the shoe, the slide 12 is moved upwardly thereby to exert heavy pressure on the shoe bottom. For thus moving the slide, a toggle mechanism composed of links 132 and 133 is provided, the upper link 132 of which is pivoted by a rod 134 to a bracket 136 carried by the slide. To the knee of the toggle is connected one end of a link 138 the other end of which is connected to the upper end of an arm 140 pivotally mounted on the shaft 66. This arm carries a cam roll 142 received by a groove 144 in the cam 48. After the cam shaft has rotated sufficiently to cause the upper presser member 20 to be locked in engagement with the shoe bottom, the toggle 132 is straightened thereby to raise the slide 12 and exert heavy pressure on the shoe bottom.

The mechanism thus far described is for the most part the same as that illustrated and described in the aforementioned Winkley patent, to which reference may be made for a more complete description of this portion of the machine. The machine also includes mechanism driven by the worm 34 for causing the machine to dwell for a predetermined period of time with the pressure applied to the shoe bottom, after which the parts are returned to the positions shown in Fig. 1 before the machine comes to a stop, and mechanism operated by depression of the treadle 84 for connecting the clutch parts 40 and 42 to initiate a cycle of operation. Inasmuch as these mechanisms form no part of the present invention, they are not described herein.

In the illustrated construction the lower toggle link 133 is yieldably supported so that after a predetermined pressure has been applied to the shoe bottom by the upward movement of the slide 12, this link will move downwardly upon further straightening of the toggle. The force supporting this toggle link against downward movement is variable thereby to control the maximum pressure applied to the shoe bottom. This link is pivoted by a pin 146 (Fig. 10) to an arm 148 one end of which is pivoted at 150 to the frame of the machine. The other end of the arm 148 is connected by a link 152 to a piston 154. This piston is fitted to slide in a cylinder 156 which, as shown, is formed as a part of a cover 158 for a housing 160 containing a quantity of fluid, preferably oil. As illustrated, the housing is secured to the lower portion of the machine frame. A port 162 provides communication between the cylinder 156 and a valve chamber 164 also formed on the cover 158 and in which there is fitted for vertical sliding movement a valve 166. An outlet port 168 provides communication between the valve chamber 164 and the interior of the housing 160. When the valve 166 is in the position illustrated in Fig. 10, it prevents flow of fluid from the cylinder 156, through the port 162, the valve chamber 164 and the outlet port 168 to the housing 160. The piston 154 is thus supported against downward movement, in the position illustrated, by the fluid trapped below it.

During straightening movement of the toggle links, the force exerted upwardly by the link 132 to apply pressure to the shoe bottom is equal to the downward force exerted by the link 133 on the arm 148 by which the link is supported. The pressure on the fluid trapped below the piston 154 will accordingly be proportional to the pressure on the shoe bottom, and as long as the valve 166 remains closed the arm 148 will be supported against downward movement so that the pressure on the shoe bottom will increase as the toggle is straightened. The upper portion of the valve 166 is enlarged to form a shoulder 170 against which the fluid in the cylinder acts, there being an annular chamber between the valve below its enlarged portion and the valve chamber which is in constant communication by the port 162 with the cylinder 156. The valve is normally held in its closed position by a spring 172 seated in a counterbore in the upper part of the valve. The upper end of the spring bears against a collar 174 carried by a rod 176 which is arranged to be positioned heightwise in accordance with the size of the shoe being operated upon, as will be described. The heightwise position of the rod determines the initial compression of the spring 172 which in turn determines the amount of pressure required to move the valve upwardly against the force of the spring. It will thus be seen that as the toggle links 132, 133 are straightened the pressure applied to the shoe bottom will increase and the pressure of the fluid below the piston 154 will likewise increase until the pressure is sufficient to overcome the force exerted by the spring 172 and move the valve 166 upwardly. This upward movement of the valve permits fluid to escape from the cylinder 156 through the ports 162, 168 into the housing 160. Upon the escape of a minute quantity of fluid the pressure of the fluid will drop so that the spring 172 will cause the valve 166 to close very soon after its opening movement. As the toggle continues to straighten, the pressure of the fluid below the piston 154 will again increase and cause the valve again to open. This action will take place continually until the toggle links 132 and 133 are completely straightened and the pressure exerted on the shoe bottom will be substantially that which was applied thereto at the time that the valve 166 first opened. To prevent excessively rapid opening and closing of the valve, the lower portion of the valve is seated tightly within the valve chamber and a restricted opening 171 provides communication between the valve chamber below the valve and the housing 160, thereby forming a dashpot. This arrangement does not slow down the valve motion sufficiently to permit any appreciable variation in the pressure of the fluid in the cylinder 156 but does retard the movements of the valve in opposite directions sufficiently to prevent objectionable vibration.

In the bottom of the cylinder 156 is a port 180 providing communication between the cylinder and the interior of the housing 160. This port is normally closed by a check valve 182 maintained seated by a spring 184 acting between a nut 186 on the lower end of a stem 188 of the valve and a plate 190 secured to the under side of the cylinder housing. Washers 192 maintain this plate spaced from the cylinder housing to permit flow of fluid through the port 180 into the cylinder 156 when the valve is opened. During straightening of the toggle 132 to apply pressure to the shoe bottom, the valve 182 remains seated and the port 162 provides the only path of escape of the fluid. When the parts of the machine are returned to their loading positions, the piston 154 is moved upwardly within the cylinder 156 causing a reduction in pressure therein which results in the valve 182 being opened so that the space below the piston may be maintained filled with oil.

The upper end of the rod 176 engages the under surface of a wedge member 196 (Fig. 7) in the form of a segment having on its upper face an inclined wedge surface 198. A similar wedge member 200, having a correspondingly inclined wedge surface 202 on its under face is supported above the wedge member 196. These wedge members are pivotally and slidably mounted between inwardly extending ears 204 of a bracket 206 by a pin 208. At a predetermined time in the operation of the machine, the upper wedge member 200 is moved downwardly a predetermined amount causing the lower wedge member 196 to be depressed an amount depending upon the relative positions of the wedge members about the axis of the pin 208, thereby to compress the spring 172 in accordance with the size of the shoe as will be explained. The bracket 206 by which the wedge members are supported is secured to a plate 210 (Figs. 6 and 10) which is in turn carried by the cam shaft 46 and a rod 211 supported by a web 212 (Fig. 1) of the frame of the machine.

The downward movement of the wedge member 200, after the wedges have been previously positioned about the pin 208 by means to be described, is effected by the following structure. This wedge member is carried by a member 214 (Fig. 7) having a T-shaped portion 216 received by a correspondingly shaped slot 218 (Fig. 5) in the upper face of the wedge member. This slot is curved, the center of curvature coinciding with the axis of the pin 208 so that the wedge member can be adjusted about the pin while being thus supported. The member 214 is pivoted by means of a pin 220 to the lower end of a toggle link 222. The upper end of the link 222 is pivoted to a second toggle link 224 (Figs. 6 and 10) which is in turn pivoted at 226 to the plate 210. Secured to the shaft 66 is an upwardly extending arm 228 to the upper end of which is pivoted one end of a link 230. The other end of the link is slotted to provide a lost motion connection between the link and the toggle links 222 and 224. As the table 14 is moved rearwardly by the link 60 which is in turn moved by the cam 48, the rocking movement of the arm 64 carrying the cam roll 68 rocks the shaft 66 so that the arm 228 moves therewith. After the table 14 has been moved rearwardly a predetermined amount but prior to the completion of its rearward movement, the lost motion between the link 230 and the toggle links 222 and 224 is taken up so that these links are straightened, thereby moving the upper wedge member 200 downwardly a predetermined amount. This causes the lower wedge member 196 to move downwardly thereby to compress the spring 172 an amount depending upon the amount of downward movement of the lower wedge member which in turn depends upon the relative positions of the wedge members around the pin 208.

Figures 4, 5:
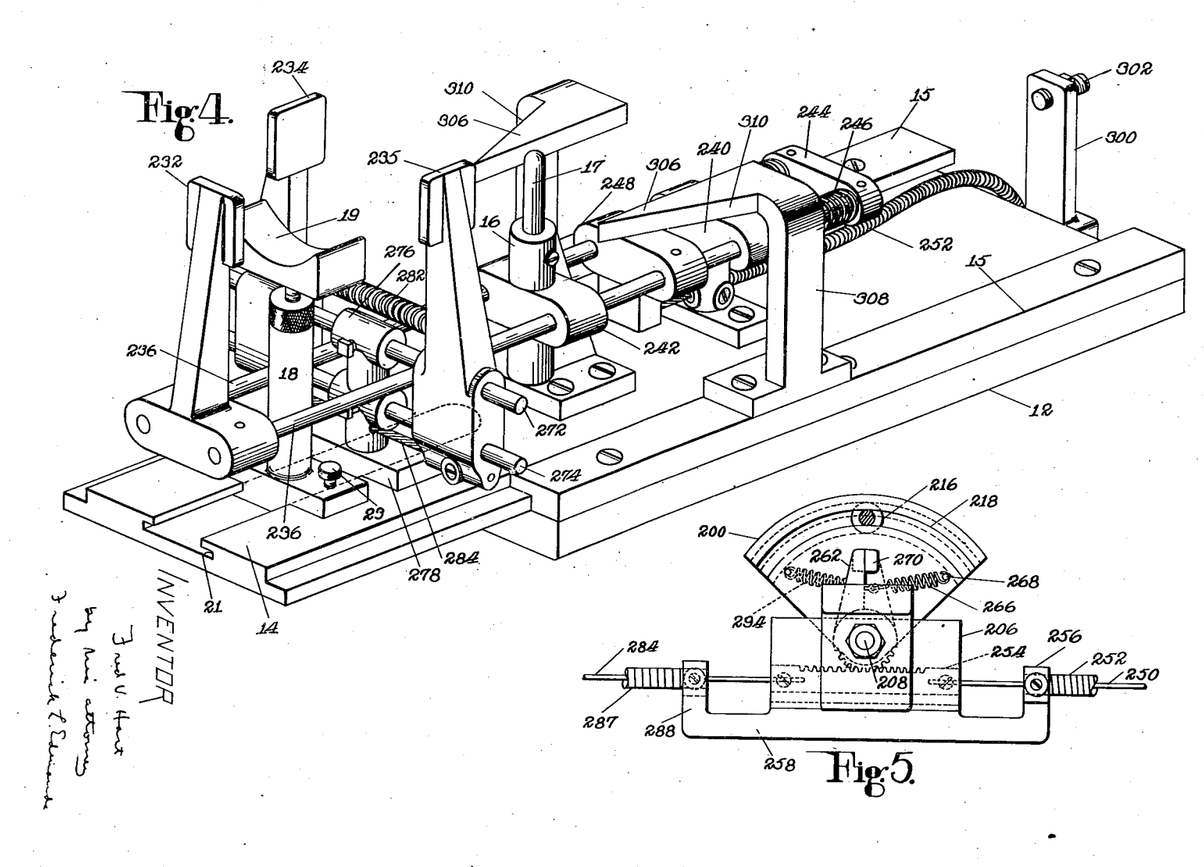
Fig. 4 is an angular view of the shoe support and associated gages.
Fig. 5 is a plan view of the wedge members by which the pressure applied to the shoe bottom is determined and illustrating the means by which the positions of the wedge members are adjusted.
Figures 6, 7, 9:
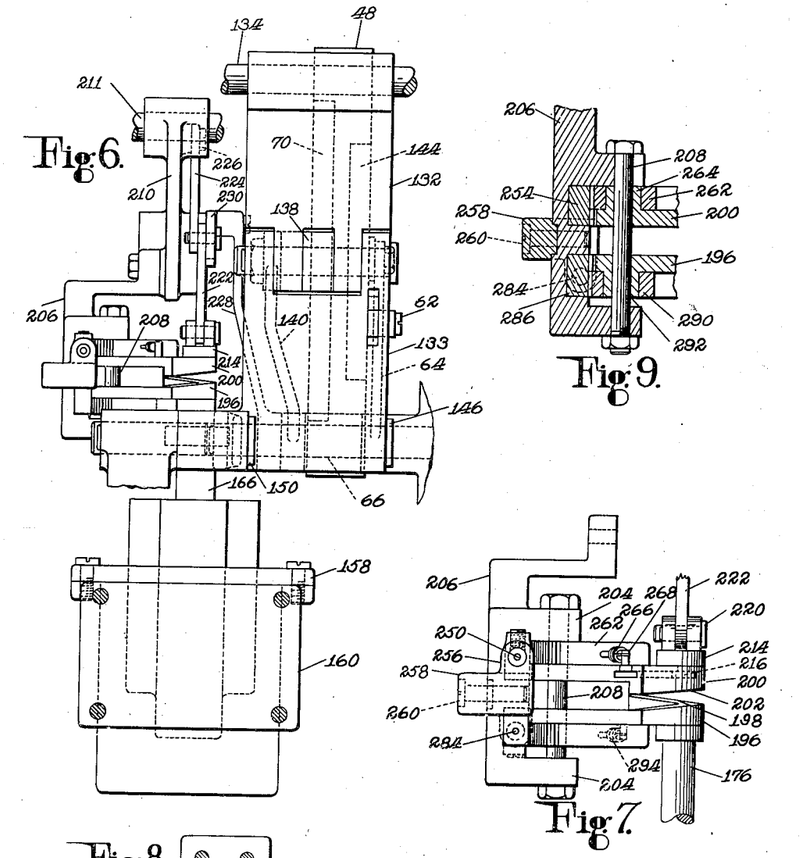
Fig. 6 is a view in front elevation of the wedge members and associated mechanism.
Fig. 7 is a view in front elevation of the wedge members on a larger scale than Fig. 6.
Fig. 9 is a sectional detail view illustrating the mounting of the wedge members.
Figure 8:
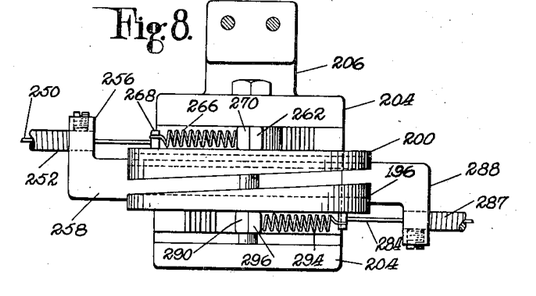
Fig. 8 is a view of the wedge members taken at right angles to Fig. 7.

The relative positions of the wedge members around this pin is determined by the size of the shoe supported on the heel and toe posts 16 and 18, as will now be described. Movably carried by the table 14 are a toe gage 232 and a pair of side gages 234, 235. The toe gage 232 is secured to the forward ends of a pair of rods 236 which are supported for movement lengthwise of the table 14 by a bracket 240. Additional support for the rods 236 is afforded by projections 242 extending laterally from the heel post 16. Secured to the rearward ends of the rods 236 is an arm 244 forming an abutment for a pair of springs 246, the forward ends of which engage the rearward surface of the bracket 240. The springs 246 thus urge the toe gage 232 rearwardly toward the toe support 19. Secured to the rods 236 between the heel post 16 and the bracket 240 is a bar 248 having a depending portion in which is secured one end of a Bowden wire 250 (Fig. 2). This wire is enclosed by a sheath 252 one end of which is secured within the bracket 240. The other end of the wire 250 is secured to a rack 254 slidably mounted in the bracket 206 (Figs. 5 and 9). The other end of the sheath 252 is secured to an ear 256 carried by an arm 258 secured by a screw 260 (Figs. 7 and 9) to the bracket 206. The rack 254 engages teeth formed on an arm 262 journaled on a hub portion 264 (Fig. 9) of the upper wedge member 200. The arm 262 is connected by a spring 266 (Fig. 7) and a pin 268 to the upper wedge member 200. Projecting upwardly from the wedge member 200 is a dog 270 (Fig. 5) which limits clockwise movement of the wedge member relatively to the arm 262. Upon forward movement of the toe gage 232 the rack 254 is moved to the right, as viewed in Fig. 5, by the connection to the bar 248 movable with the toe gage, thereby causing the arm 262 to move in a counterclockwise direction. The connection of the arm 262 by the spring 266 to the upper wedge member will cause the wedge member to follow the movement of the arm, with the dog 270 in engagement with the arm as long as the wedge member is free to move. When, however, the wedge member is held against movement, the arm 262 may be moved relatively thereto in a counterclockwise direction by reason of the spring connection to the wedge member, the purpose of which will appear as the description proceeds.

The side gages 234, 235 are carried by rods 272, 274 extending laterally from opposite sides of a post 276 on a slide 278 supported by the table 14. A locking screw 280 (Fig. 2) is provided for holding the slide in the desired position lengthwise of the table 14. The gages 234 and 235 are movable widthwise of the table and are connected by a tension spring 282 which urges them toward each other. When a shoe is positioned on the heel and toe rests the gages are moved apart on the rods 272 and 274 equally to a distance depending upon the width of the shoe bottom. To the gage 235 is secured one end of a Bowden wire 284 (Fig. 3), the other end of which is connected to a rack 286 carried by the bracket 206 (Fig. 9) below the rack 254. The wire is enclosed by a sheath 287, one end of which is secured in an ear 288 of the arm 258 (Fig. 5) and the other end of which is received within the lower portion of the gage 234 (Fig. 3). The rack 286 engages teeth on the inner end of an arm 290 journaled on the hub 292 of the wedge member 196 (Fig. 9), the arm being connected by a spring 294 to the wedge member. This arm is normally engaged by a dog 296 depending from the under surface of the wedge member 196 causing the wedge member normally to move with the arm in response to movement of the gage 235. It will thus be seen that as the toe gage 232 is moved toward the left, as viewed in Figs. 2 and 4, and the side gages 234, 235 are moved outwardly by the placing of a shoe on the heel and toe rests, the wedge members 200 and 196 will move in opposite directions about the pin 208. The space between the surfaces 198 and 202 of the wedge members will depend upon the extent of movement of the wedge members which in turn will depend upon the positions to which the gages are moved, which is controlled by the length and width of the shoe bottom. Accordingly, when the wedge member 200 is moved downwardly a fixed distance by the straightening of the toggle links 222 and 224, the lower wedge member 196 will be moved downwardly a distance which will vary in accordance with variations in the length and width of the bottoms of shoes of different sizes so that the initial compression of the spring 172 which tends to maintain the valve 166 closed will vary in accordance with the size of the shoe.

In order that the toe and side gages will not interfere with the movement of the upper presser member 20 into engagement with the shoe bottom, provision is made for moving the gages away from the shoe during rearward movement of the table 14 to position the shoe below the upper presser member. Extending upwardly from the rear portion of the slide 12 is a post 300 in the upper end of which is threaded an abutment screw 302 arranged to be engaged by the arm 244 secured to the rearward ends of the rods 236 carrying the toe gage. A lock nut 304 holds the screw 302 in adjusted position so that it is engaged by the arm 244 at the desired time during the rearward movement of the table 14. After the arm 244 engages the stop screw 302, further rearward movement of the toe gage 232 is prevented and the shoe is carried rearwardly therefrom as the table 14 completes its rearward movement. Fixed cam members 306 are carried at the upper ends of posts 308 which are secured to the gibs 15 on the upper portion of the slide 12. These cam members have outwardly inclined cam surfaces 310 which act on the side gages 234 and 235 during rearward movement of the table 14 to move these gages outwardly of the shoe. It will be understood that before the toe and side gages are moved away from the shoe the upper wedge member 200 has been moved into engagement with the lower wedge member by the straightening of the toggle links 222 and 224. Consequently, while the arms 262 and 290, associated with the upper and lower wedge members respectively, will be moved by the gages as they move away from the shoe, the wedge members will be frictionally locked together and will not follow the movement of the arms, this relative movement of the arms and wedge members being permitted by the spring connections therebetween.

Figure 1:
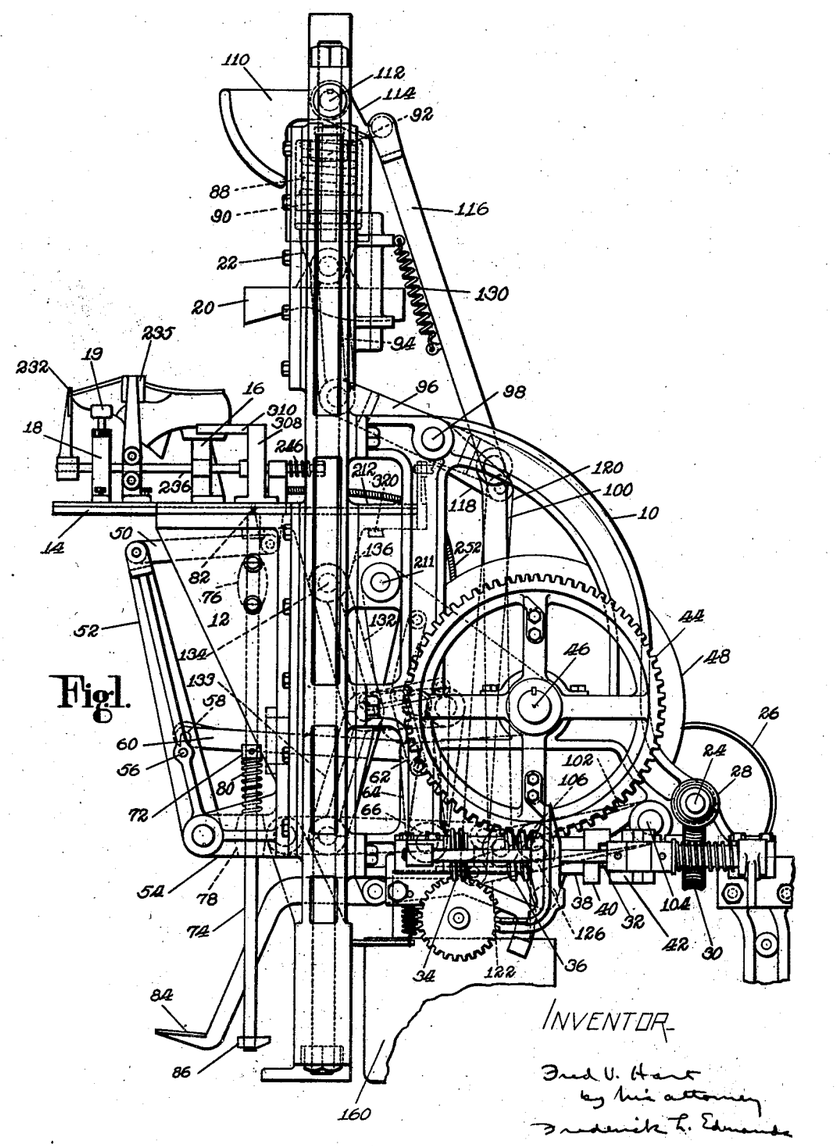
Fig. 1 is a view in side elevation of a machine in which the invention is embodied.
Figures 2, 3:
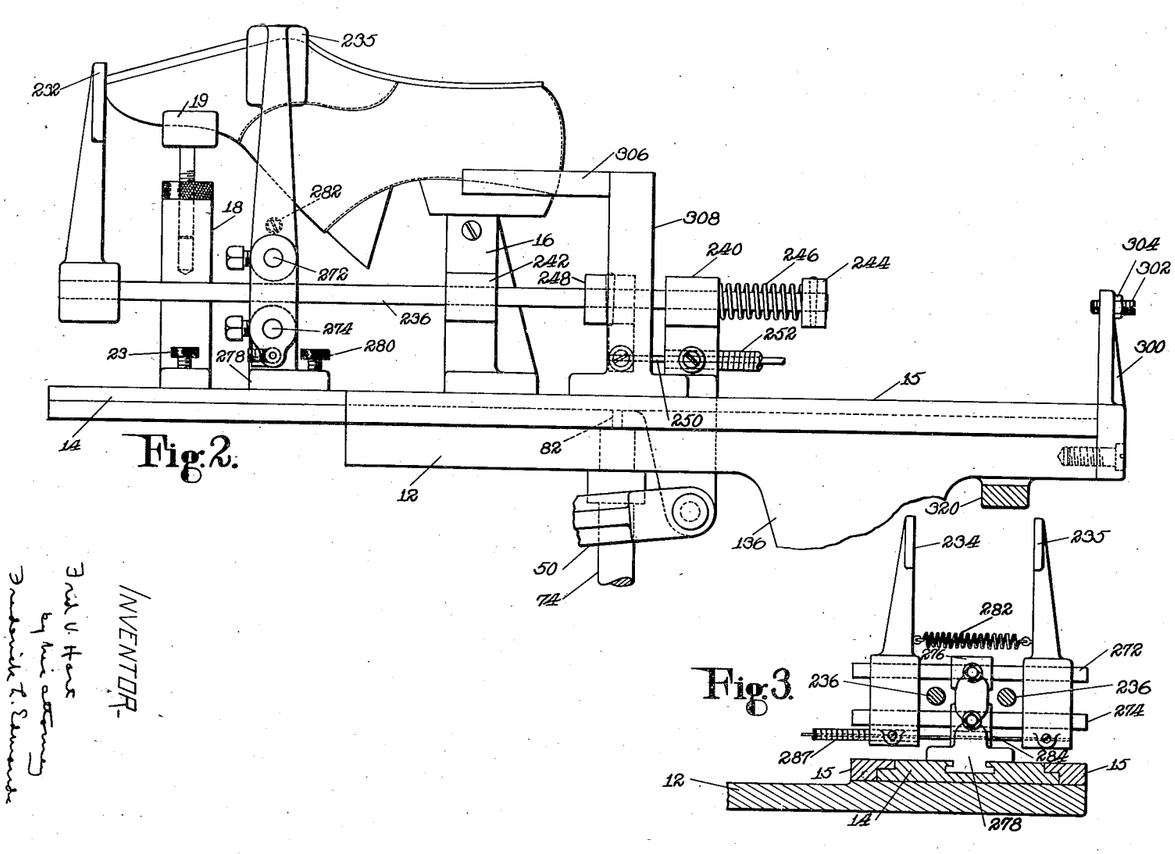
Fig. 2 is a view in side elevation on a larger scale than Fig. 1 of the shoe support and the gages associated therewith.
Fig. 3 is a transverse section through the shoe support illustrating the side gages which contact the edge of the sole in the vicinity of the ball line.

In the operation of the machine, a shoe is placed on the toe and heel rests when the table 14 is in its forward position, as shown in Fig. 1. The toe and side gages will be moved to positions corresponding with the length and width of the shoe bottom, which in turn will act through the racks and arms controlled thereby to move the wedge members 196 and 200 about the pin 208 so that the distance between the wedge faces will vary in accordance with the size of the shoe bottom. At this time, while the machine is at rest, the wedge members are supported in separated positions, the lower wedge member resting upon the upper end of the rod 176 which is in turn supported by the spring 172 of the valve 166, this spring being fully expanded at this time. The operator now depresses the treadle 84, thereby connecting the clutch elements 40, 42, causing rotation of the cam shaft 46. At the same time the link 60 is permitted to move downwardly into engagement with the pin 56 carried by the lever 52 so that, as the cam 48 rotates, the table 14 is moved rearwardly on the slide 12. During this rearward movement the toggle links 222 and 223 are straightened to move the upper wedge member 200 downwardly against the wedge member 196 to compress the valve spring 172 an amount depending upon the previous setting of the wedges corresponding to the size of the shoe bottom. After the wedges have thus been moved together and before the completion of the rearward movement of the table 14, the toe and side gages are moved away from the shoe bottom so that they are out of the path of downward movement of the upper presser member 20 after the shoe has been moved into position to be operated upon. The upper presser member 20 is now permitted to move downwardly under the force exerted by the spring 80 into engagement with the shoe bottom in which position it is then locked by the cam 110. The slide 12 is now moved upwardly by the straightening of the toggle links 132, 133 so that the shoe bottom is forced against the upper presser member 20 under heavy pressure. As the toggle links 132, 133 straighten, an increasing downward pressure is exerted on the piston 154 which is supported in the position shown in Fig. 10 by the fluid trapped therebelow. This pressure will continue to increase until it is sufficient to overcome the force exerted by the spring 172 in holding the valve 166 in its closed position. After the pressure on the shoe bottom reaches a predetermined amount, the valve 166 moves upwardly against the force exerted by the spring 172, thereby permitting passage of the fluid from the cylinder 156 through the ports 162 and 168 into the housing 160 and downward movement of the arm 148. This downward movement will be very slight inasmuch as the valve will be closed by the spring in response to a slight decrease in pressure, and the pressure will rapidly build up again to the predetermined value during further straightening of the toggle. There will thus be a series of rapid opening and closing movements of the valve until the straightening of the toggle is completed and the variations in pressure below the piston 154 will be held within a narrow range so that the pressure exerted on the shoe will be maintained at the value previously determined by the initial compression of the spring 172, which is in turn controlled by the gages which measure the size of the shoe. The pressure is maintained on the shoe bottom for a predetermined length of time, as explained in detail in the aforementioned Winkley patent, after which the slide 12 is lowered and the presser member 20 raised to its original position. The slide 12 is lowered by the breaking of the toggle composed of links 132, 133 until the slide reaches a position determined by its engagement with a stop 320 (Figs. 2 and 10) on the frame of the machine. The support reaches this position before the toggle has been completely broken so that further breaking movement of the toggle causes the arm 148 to move upwardly carrying the piston 154 back to its initial position. This upward movement of the piston causes fluid to be drawn from the reservoir through the port 180 so that the space below the piston is maintained full of operating fluid in readiness for the next cycle of operation.

It will thus be seen that the total pressure applied to the shoe bottom depends upon the setting of the valve spring 172 which is in turn controlled by the wedge members 196 and 200 adjusted by the toe and side gages in accordance with the size of the shoe. The machine, therefore, automatically causes a substantially uniform unit pressure to be applied to the shoe bottom regardless of its size.

Having thus described the invention, what I claim as new and desire to secure by Letters Patent of the United States is:

1. In a machine for applying pressure to work, the combination with members relatively movable to apply pressure to work pieces of different sizes, of power-operated means for effecting such relative movement of said members, and means for controlling said power-operated means to vary automatically as determined by the area of a pressure-receiving face of each work piece the total amount of pressure applied.

2. In a machine for applying pressure to work, the combination with members relatively movable to apply pressure to work pieces of different sizes, of power-operated means for effecting such relative movement of said members, and means responsive to variations in the area of the pressure-receiving faces of different work pieces for controlling said power-operated means to vary the total amount of pressure applied.

3. In a machine for applying pressure to work, the combination with members relatively movable to apply pressure to work pieces of different sizes, of power-operated means for effecting such relative movement of said members, and means operative in response to the area of a pressure-receiving face of the work piece for controlling said power-operated means to cause a predetermined unit pressure to be applied thereto.

4. In a machine for applying pressure to work, the combination with members relatively movable to apply pressure to work pieces of different sizes, of power-operated means for effecting such relative movement of said members, and means associated with one of said members for measuring the area of a pressure-receiving face of the work by engagement with its periphery to control the total pressure applied thereto.

5. In a machine for applying pressure to shoe bottoms, a shoe support, a presser member, means for relatively moving said shoe support and presser member to apply pressure to a shoe, and means for automatically controlling said moving means to vary the total pressure applied to the shoe in accordance with its size.

6. In a machine for applying pressure to shoe bottoms, a shoe support, a presser member, means for relatively moving said shoe support and presser member to apply pressure to a shoe, and means operative in response to the size of the shoe on the support for controlling the total pressure applied to the shoe bottom.

7. In a machine for applying pressure to shoe bottoms, a shoe support, a presser member, means for relatively moving said shoe support and presser member to apply pressure to a shoe, and means operative in response to the size of the shoe on the support in control of said pressure-applying means to cause a predetermined unit pressure to be applied to the shoe bottom regardless of its size.

8. In a machine for applying pressure to shoe bottoms, a shoe support, a presser member, means for relatively moving said shoe support and presser member to apply pressure to a shoe, and means associated with said shoe support arranged to be positioned by engagement with the periphery of the shoe bottom to control the total pressure applied thereto.

9. In a machine for applying pressure to shoe bottoms, a shoe support, a presser member, means for relatively moving said shoe support and presser member to apply pressure to a shoe, and means associated with said shoe support arranged to be positioned by engagement with the periphery of the shoe bottom to control the operation of said pressure-applying means to vary the total pressure applied to the shoe in accordance with its size.

10. In a machine for applying pressure to shoe bottoms, a shoe support, a presser member, means for relatively moving said shoe support and presser member to apply pressure to a shoe, means associated with said support for gaging the length of a shoe thereon, and means operated by said gaging means for varying the pressure applied to the shoe in accordance with its length.

11. In a machine for applying pressure to shoe bottoms, a shoe support, a presser member, means for relatively moving said shoe support and presser member to apply pressure to a shoe, means associated with said support for gaging the width of a shoe thereon, and means operated by said gaging means for varying the pressure applied to the shoe in accordance with its width.

12. In a machine for applying pressure to shoe bottoms, a shoe support, a presser member, means for relatively moving said shoe support and presser member to apply pressure to a shoe, means associated with said support for gaging the length and width of the shoe thereon, and means operated by said gaging means for varying the pressure applied to the shoe in accordance with its length and width.

13. In a machine for applying pressure to shoe bottoms, a shoe support, a presser member, means for relatively moving said shoe support and presser member to apply pressure to a shoe, a plurality of gages associated with said support arranged to contact a shoe bottom at spaced points around its periphery, and means operated by said gages to control the pressure-applying means to cause a predetermined unit pressure to be applied to the shoe bottom regardless of its size.

14. In a machine for applying pressure to shoe bottoms, a shoe support, a presser member, means for relatively moving said shoe support and presser member to apply pressure to a shoe, a plurality of gages associated with said support arranged to contact a shoe bottom at spaced points around its periphery, means operated by said gages to control the pressure-applying means to cause a predetermined unit pressure to be applied to the shoe bottom regardless of its size, and means for retracting said gages prior to the application of pressure to the shoe bottom.

15. In a machine for applying pressure to shoe bottoms, a shoe support, a presser member, means for relatively moving said shoe support and presser member to apply pressure to a shoe, said means including a toggle, means for adjustably supporting one of the links of said toggle, and means operative in response to the size of a shoe on the support for adjusting said supporting means to cause a predetermined unit pressure to be applied to the shoe bottom by the operation of said toggle.

16. In a machine for applying pressure to shoe bottoms, a shoe support, a presser member, means for relatively moving said shoe support and presser member to apply pressure to a shoe, fluid-pressure means for determining the total pressure applied to the bottom of a shoe on the support, and means responsive to the size of the shoe being operated upon for controlling said fluid-pressure means.

17. In a machine for applying pressure to work, the combination with members relatively movable to apply pressure to work pieces of different sizes, of power-operated means for effecting such relative movement of said members, fluid-pressure means for controlling said power-operated means, and means responsive to variations in size of different work pieces for controlling said fluid-pressure means.

18. In a machine for applying pressure to work, the combination with members relatively movable to apply pressure to work pieces of different sizes, of power-operated means for effecting such relative movement of said members, said power-operated means including a fluid-presssure-controlled member and a valve for controlling the pressure of the fluid to determine the total pressure applied to the work piece.

19. In a machine for applying pressure to shoe bottoms, a shoe support, a presser member, and means for relatively moving said shoe support and presser member to apply pressure to a shoe, said means including a fluid-pressure-controlled member and a valve for controlling the pressure of the fluid to determine the total pressure applied to the bottom of the shoe.

20. In a machine for applying pressure to shoe bottoms, a shoe support, a presser member, and means for relatively moving said shoe support and presser member to apply pressure to a shoe, said means including a fluid-pressure-controlled member, a pressure-regulating valve in control of said fluid-pressure-controlled member and means responsive to the size of the shoe on the support for controlling said pressure-regulating valve.

21. In a machine for applying pressure to shoe bottoms, a shoe support, a presser member, means for relatively moving said shoe support and presser member to apply pressure to a shoe, a fluid-pressure-controlled member for determining the total pressure applied to the bottom of a shoe on the support, a pressure-regulating valve in control of said fluid-pressure-controlled member, gages arranged to be positioned by a shoe on the support in accordance with the size of the shoe, and means operated by said gages for controlling said pressure-regulating valve.

22. In a machine for applying pressure to shoe bottoms, a shoe support, a presser member, means for relatively moving said shoe support and presser member to apply pressure to a shoe, gages carried by said support and arranged to be positioned by a shoe on the support in accordance with the length and width of the shoe, a fluid-pressure-controlled member for determining the total pressure applied to the bottom of a shoe on the support, a pressure-regulating valve in control of said fluid-pressure-operated member, means operated by said gages for controlling the pressure-regulating valve, and means for moving said gages away from the shoe prior to the application of pressure on the bottom thereof.

23. In a machine for applying pressure to shoe bottoms, a shoe support, a presser member, means for relatively moving the shoe support and presser member to apply pressure to a shoe, a pair of wedge members, means for relatively positioning said wedge members in accordance with the size of a shoe on the support, and means controlled by the relative positions of said wedge members for determining the total pressure applied to the shoe bottom.

24. In a machine for applying pressure to shoe bottoms, a shoe support, a presser member, means for relatively moving said shoe support and presser member to apply pressure to a shoe, a pair of cooperating wedge members, means for positioning one of said wedge members in accordance with the length of a shoe on the support, means for positioning the other wedge member in accordance with the width of the shoe, and means controlled by the relative positions of the wedge members for determining the pressure applied to the shoe bottom.

25. In a machine for applying pressure to shoe bottoms, a shoe support, a presser member, means for relatively moving said shoe support and presser member to apply pressure to a shoe, a pair of adjacent wedge members, said wedge members having wedge surfaces on their adjacent faces, means mounting said wedge members for individual turning movement about a single axis, means for adjusting said wedge members about said axis relatively to each other in accordance with the length and width of the shoe on the support, and means operative in response to the relative positions of the wedge members about said axis for controlling the pressure applied to the shoe bottom.

26. In a machine for applying pressure to shoe bottoms, a shoe support, a presser member, means for relatively moving said shoe support and presser member to apply pressure to a shoe, a pair of wedge members having cooperating wedge surfaces, a spring for supporting one of the wedge members, means for supporting the other wedge member with its wedge surface spaced from the wedge surface of the first wedge member, means for adjusting said wedge members in parallel planes to vary the spacing between the wedge surfaces in accordance with the size of the shoe on the support, means for moving the other of said wedge members a fixed distance toward said first wedge member, thereby to compress the spring supporting the first wedge member an amount depending upon the size of the shoe on the support, and means controlled by said spring for determining the maximum pressure applied to the shoe bottom.

27. In a machine for applying pressure to shoe bottoms, a shoe support, means associated with said shoe support arranged to be positioned in accordance with the length and width of a shoe thereon, means controlled by said positioning means for predetermining the maximum pressure to be applied to the shoe bottom, and means for applying pressure to the shoe bottom up to said predetermined maximum.

28. In a machine for applying pressure to shoe bottoms, a shoe support, means associated with said shoe support arranged to be positioned in accordance with the length and width of a shoe thereon, means controlled by said positioning means for predetermining the maximum pressure to be applied to the shoe bottom, means for moving said positioning means away from the shoe, and means for thereafter applying said maximum pressure to the shoe bottom.

29. In a machine for applying pressure to shoe bottoms, a shoe support, a presser member, means for moving said shoe support from loading position into a position below said presser member, means for moving said shoe support toward said presser member to press the bottom of a shoe on the support against the presser member, gages carried by said shoe support arranged to be positioned in accordance with the size of a shoe thereon, means controlled by said gages for determining the maximum pressure applied to the shoe bottom, and means operative in response to movement of the shoe support from its loading position into position below the presser member for moving said gages away from the shoe.

30. In a machine for applying pressure to shoe bottoms, a shoe support, a presser member, means for relatively moving said shoe support and presser member to apply pressure to a shoe, said means comprising a toggle, a piston supporting one link of the toggle, a cylinder containing said piston and arranged to contain fluid for supporting the piston at a predetermined heightwise position within the cylinder, a pressure-regulating valve arranged to permit flow of fluid from the cylinder after a predetermined pressure has been applied to the shoe bottom, a spring acting to maintain said valve closed, and means for adjusting said spring to vary the pressure applied to the shoe bottom.

31. In a machine for applying pressure to shoe bottoms, a shoe support, a presser member, means for relatively moving said shoe support and presser member to apply pressure to a shoe, said means comprising a toggle, a piston supporting one link of the toggle, a cylinder containing said piston and arranged to contain fluid for supporting the piston at a predetermined heightwise position within the cylinder, a pressure-regulating valve arranged to permit flow of fluid from the cylinder after a predetermined pressure has been applied to the shoe bottom, a spring acting to maintain said valve closed, and means operated by placing a shoe on the support for adjusting the spring in accordance with the size of the shoe thereby to control the maximum pressure applied to the shoe bottom.

32. In a machine for applying pressure to shoe bottoms, a shoe support, a presser member, means for relatively moving said shoe support and presser member to apply pressure to a shoe, said means comprising a toggle, a piston supporting one link of the toggle, a cylinder containing said piston and arranged to contain fluid for supporting the piston at a predetermined heightwise position within the cylinder, a pressure-regulating valve arranged to permit flow of fluid from the cylinder after a predetermined pressure has been applied to the shoe bottom, a spring acting to maintain said valve closed, gages associated with said support and arranged to be positioned in accordance with the length and width of the bottom of a shoe on the support, means operated by said gages for adjusting said spring to control the maximum pressure applied to the shoe bottom in accordance with the size of the shoe, and means for moving said gages away from the shoe into inoperative positions prior to the application of pressure to the shoe bottom.

FRED V. HART.